United States Patent
Reames et al.

(10) Patent No.: US 6,174,482 B1
(45) Date of Patent: Jan. 16, 2001

(54) METHOD OF MANUFACTURING AN INTERLOCKED, "FLUSH-TO-FRONT," INJECTION MOLDED BORDER AND GLASS SHEET

(75) Inventors: Gary Reames, Muskegon; Bob Herrmann, Spring Lake; Howard Daley, Zeeland, all of MI (US)

(73) Assignee: Gemtron Corporation, Sweetwater, TN (US)

( * ) Notice: Under 35 U.S.C. 154(b), the term of this patent shall be extended for 0 days.

(21) Appl. No.: 09/178,537

(22) Filed: Oct. 26, 1998

(51) Int. Cl.[7] .................................................. B28B 5/00
(52) U.S. Cl. ..................... 264/250; 264/255; 264/259; 264/240; 264/266; 264/274; 264/279.1; 264/271.1
(58) Field of Search ............................... 264/279.1, 250, 264/274, 255, 272.2, 240, 266, 271.1, 259

(56) References Cited

U.S. PATENT DOCUMENTS

| | | |
|---|---|---|
| 3,415,709 | 12/1968 | Santangelo . |
| 4,161,060 | 7/1979 | Lenne et al. . |
| 4,213,536 | 7/1980 | Hafner . |
| 4,835,840 * | 6/1989 | Stokes . |
| 5,049,346 * | 9/1991 | Yada et al. . |
| 5,785,047 * | 7/1998 | Bird et al. . |

* cited by examiner

Primary Examiner—Merrick Dixon
(74) Attorney, Agent, or Firm—Diller, Ramik & Wight

(57) ABSTRACT

The method of the present invention is performed by providing a glass sheet having first and second opposite surfaces merging with each other along a peripheral ground angled surface setting-off with the glass sheet first surface an included angle substantially greater than normal. The glass sheet is placed in a mold having opposing cavity portions which collectively define a cavity including a peripheral edge cavity portion defined in part by a cavity defining surface which lies in the plane of the glass sheet first surface when the mold is closed. The mold is then closed such that the cavity defining surface and the glass sheet round angled surface set-off and angled complementary to the included angle and with the glass sheet per surface abutting the cavity defining surface inboard of the glass sheet ground angled surface. Polymeric/copolymeric synthetic plastic material is injected into the peripheral cavity portion to completely encapsulate the glass sheet periphery with a border, frame or encapsulation having a first exterior surface coplanar with the glass sheet first surface whereby the latter two surfaces are "flush-to-front" and the glass sheet periphery is in undercut interlocked relationship with the injection molded border.

20 Claims, 7 Drawing Sheets

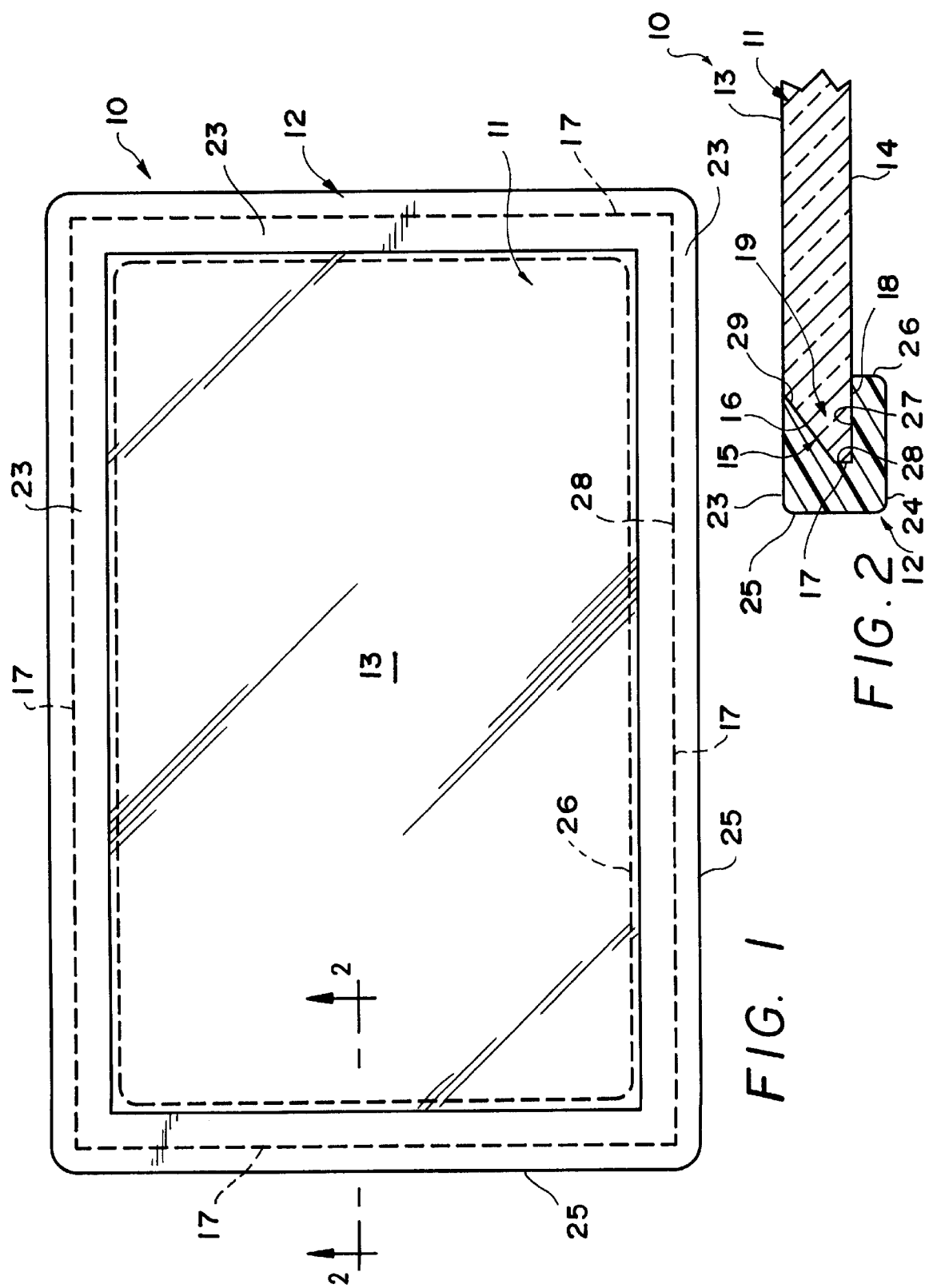

US 6,174,482 B1

METHOD OF MANUFACTURING AN INTERLOCKED, "FLUSH-TO-FRONT," INJECTION MOLDED BORDER AND GLASS SHEET

BACKGROUND OF THE INVENTION

Heretofore it has been common to provide a glass sheet with a border for subsequent utilization as a shelf, a cooktop panel or the like. If the border is an injection molded polymer/copolymeric encapsulation, it is common to utilize a bonding agent to affix the injection molded polymeric/ copolymeric frame or border to a peripheral edge of the glass sheet. In U.S. Pat. No. 5,785,047 granted to the assignee of the present invention on Jul. 28, 1998, there is disclosed a cooktop, hob top or the like which includes an injection molded encapsulation surrounding a peripheral edge of a cooktop panel with peripheral surfaces of the latter having a primer applied thereto, such as Chemlok AP-134 one-coat primer and/or Chemlok EP 6962-50A/P primer, each manufactured by Lord Corporation of 2000 West Grand View Blvd., P.O. Box 10038, Erie, Pa. 16514-10038. The primer augments the adhesion between the peripheral edge of the Ceran®, glass or equivalent panel and the encapsulation, frame or border which preferably is Santoprene® manufactured by Advanced Elastomer Systems L.P.

In order to achieve ease of cleaning and maintenance, uppermost surfaces of the cooktop, the injection molded encapsulation or border and an associated trim piece are substantially flush. However, utilization of primer, adhesive or an equivalent bonding agent to affix an extruded frame to the glass or Ceran® panel presents numerous problems, both during manufacture and when in use. Obviously, the application of a primer or a bonding agent necessitates additional cost for the material utilized and the additional costs involved in applying the primer carefully and selectively to the periphery of the Ceran® or glass panel. Delamination can also occur in use, particularly upon primer breakdown and attendant debonding of the frame and glass panel.

In lieu of injection molding a frame to a periphery of a glass sheet, it is also common to utilize a multi-part plastic frame of the type disclosed in U.S. Pat. No. 4,934,541. The multi-part plastic frame requires the separate manufacture of two frame members which are then separately assembled and united with a glass panel by ultrasonic welding. This process avoids delamination when primer breaks down and/or loses its bonding efficacy, particularly during long term use under adverse conditions. However, the costs of manufacturing multi frame members and uniting the same through ultrasonic welding is also cost prohibitive.

Each of these two approaches present more problems than solutions. The injection molding operation presents an aesthetically pleasing product, yet the costs of primer and its application is undesirably prohibitive, particularly when delamination can occur either because of ineffective priming during manufacture and/or the existence of gaps and voids which can be attacked when in use resulting in delamination. Ultrasonic welding precludes delamination, but multi-step manufacturing is cost-prohibitive. Ideally, the best of both worlds would be a "flush-to-front" interlocked, injection molded border and glass sheet lacking primer or bonding material which is relatively strong, can be abused to a considerable extent absent deterioration, is aesthetically pleasing, can be readily cleaned, and can be manufactured at minimum costs.

SUMMARY OF THE INVENTION

In keeping with the foregoing, a primary object of the present invention is to provide a novel method of manufacturing a frame, border or encapsulation along a peripheral edge portion of an article, particularly a glass panel, and simultaneously create therebetween an interlock, absent the utilization of a primer or bonding agent, while at the same time creating an aesthetic "flush-to-front" appearance.

The method of the present invention is performed by providing a glass sheet having first and second opposite surfaces merging with each other along a peripheral ground angled surface setting-off with the glass sheet first surface an included angle substantially greater than normal. The glass sheet is placed in a mold having opposing cavity portions which collectively define a cavity including a peripheral edge cavity portion defined in part by a cavity defining surface which lies in the plane of the glass sheet first surface when the mold is closed. The mold is then closed such that the cavity defining surface and the glass sheet ground angled surface set-off an angle complementary to the included angle and with the glass sheet first surface abutting the cavity defining surface inboard of the glass sheet ground angled surface. Polymeric/copolymeric synthetic plastic material is injected into the peripheral cavity portion to completely encapsulate the glass sheet periphery with a border, frame or encapsulation having a first exterior surface coplanar with the glass sheet first surface, whereby the latter two surfaces are "flush-to-front" and the glass sheet periphery is in undercut interlocked relationship with the injection molded border.

The method thus described is utilized for manufacturing numerous products, but the present invention is particularly directed to the utilization of the framed glass sheet as a computer screen or a computer glare filter, though the method is equally applicable to forming cook tops, refrigerator shelves, refrigerator doors, and the like.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a top perspective view of a novel article manufactured in accordance with this invention, and illustrates a glass sheet having a peripheral edge portion totally encapsulated by an in situ injection molded polymeric/ copolymeric plastic material frame or border.

FIG. 2 is an enlarged fragmentary vertical cross-sectional view taken generally along line 2—2 of FIG. 1 and illustrates an undercut interlocked juncture between a peripheral edge of the glass sheet and the injection molded frame, as well as the "flush-to-front" exterior thereof.

DESCRIPTION OF THE PREFERRED EMBODIMENT

Figure 3:
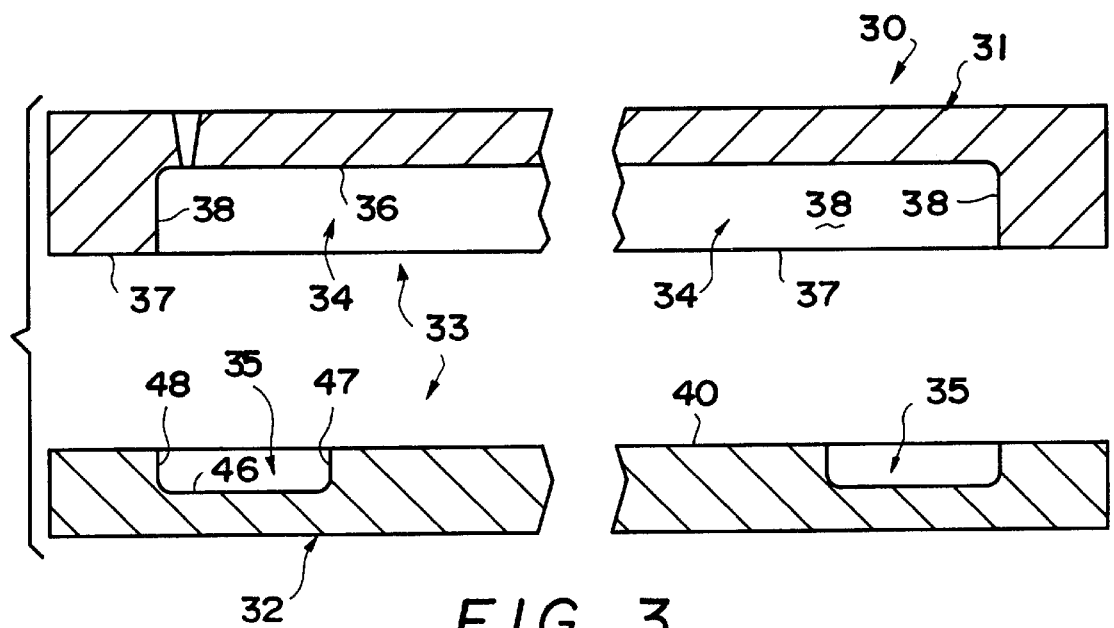
FIG. 3 is a vertical cross-sectional view taken through an injection mold of the present invention, and illustrates upper and lower mold bodies in their open position with each defining a cavity portion, which in the closed position of the mold bodies defines a mold cavity.

An article of manufacture constructed in accordance with the method of the present invention is illustrated in FIGS. 1 and 2 of the drawings and is generally designated by the reference numeral 10.

The article of manufacture 10 is specifically designed for utilization as a computer screen or a computer glare filter, and includes a first component or glass sheet 11 and a second component in the form of a frame, encapsulation, border or border portion 12 injection molded from polymeric/copolymeric synthetic plastic material, such as Santoprene®, PVC, crayton, polypropylene, or an equivalent material.

The glass sheet or first component 11 may have specific characteristics associated therewith which are created during fabrication depending primarily upon end use applications. For example, the glass sheet 11 might have anti-glare characteristics, and preferably the glass is tempered in a conventional manner. The glass sheet 11 includes a first surface 13 which in use is intended to be the front or outer surface and an opposite generally parallel rear or second surface 14. As is best illustrated in FIG. 2, the surfaces 13, 14 merge with each other along a peripheral surface 15 which includes an angled surface 16 setting-off with the glass sheet first surface 13 an included angle substantially greater than normal, such as 135°. The glass sheet 11 is normally cut from a larger sheet in a conventional manner and when thus cut, a terminal peripheral surface (not shown) is substantially normal to the surfaces 13, 14. However, after the latter fabrication, the angled surface 16 is formed by grinding the first surface 13 in a conventional manner. The ground angled surface 16 merges with the second surface 14 at a peripheral terminal edge surface 17 which ranges in size between 0.005 to 0.02 inch.

The second component, border, frame or encapsulation 12 substantially completely and continuously peripherally encapsulates the peripheral surface 15, the angled surface 16 thereof, the peripheral terminal edge surface 17, and a peripheral surface area 18 of the second surface 14 of the glass sheet 11 which substantially underlies the angled ground surface 16.

The encapsulation or frame 12 includes a first surface 23 opposite and parallel to a second surface 24 which merge with each other at a peripheral surface 25 which is substantially normal to the surfaces 23, 24. It should be particularly noted that the surfaces 13, 23 of the respective glass sheet 11 and the frame, border or encapsulation 12 lie in a common plane which corresponds to the exterior or outer side of the end use application, as in the case of a computer screen. Thus, in this position the surfaces 13, 23 define a "flush-to-front" aesthetic appearance to the exterior of the computer screen 10.

The encapsulation or frame 12 also includes an inboard peripheral surface 26 which is substantially parallel to the surface 25 and surfaces 27, 28 and 29 which mirror the respective surfaces 18, 17 and 15 of the sheet of glass 11. The surfaces 27 through 29 essentially define an inwardly opening interlocking groove 19 which interlocks with a peripheral surface area of the glass sheet 11 through intimate engagement between the respective surfaces 18, 27; 17, 28 and 15, 29. Thus, the computer screen 10 not only presents a "flush-to-front" aesthetic appearance when in use, but the interlock achieved between the glass sheet 11 and the frame 12 is accomplished absent primer, bonding material, intricate undercutting, multiple part fabrication and separate unification by sonic welding or the like.

The article 10 of FIGS. 1 and 2 is formed by injection molding the encapsulation or frame 12 along the periphery of the glass sheet 11 in a mold 30 of FIGS. 3 through 7. The mold 30 includes an upper mold body 31 and a lower mold body 32 which collectively define a mold cavity 33 when the mold bodies 31, 32 are closed in a conventional manner. Injection ports, sprues, runners, etc. are all conventional and are not shown in FIGS. 3 through 7 of the drawings.

The cavity 33 of the mold 30 includes respective cavity portions 34, 35 defined by the respective mold bodies 31, 32.

The cavity portion 34 of the mold cavity 35 is of a generally rectangular downwardly opening configuration. A first cavity portion defining surface 36 which is substantially parallel to a second or parting surface 37 which defines a parting plane with a like parting surface 40 of the mold body 32. A peripheral surface 38 merges the surfaces 36, 37 and corresponds in size and shape to the peripheral surface 25 of the encapsulation 12 (FIG. 2). The cavity portion 34 is thus a relatively shallow rectangular downwardly opening cavity.

The cavity portion 35 of the mold body 32 is defined by a first cavity portion defining surface 46 and opposite surfaces 47, 48 which are substantially in parallel relationship to each other. As viewed from above, the cavity portion 35 is of a substantially upwardly opening polygonal channel-like configuration with the surfaces 47, 48 of the mold body 32 corresponding to the eventually formed surfaces 26, 17, respectively, of the border, frame or encapsulation 12.

Figure 4:
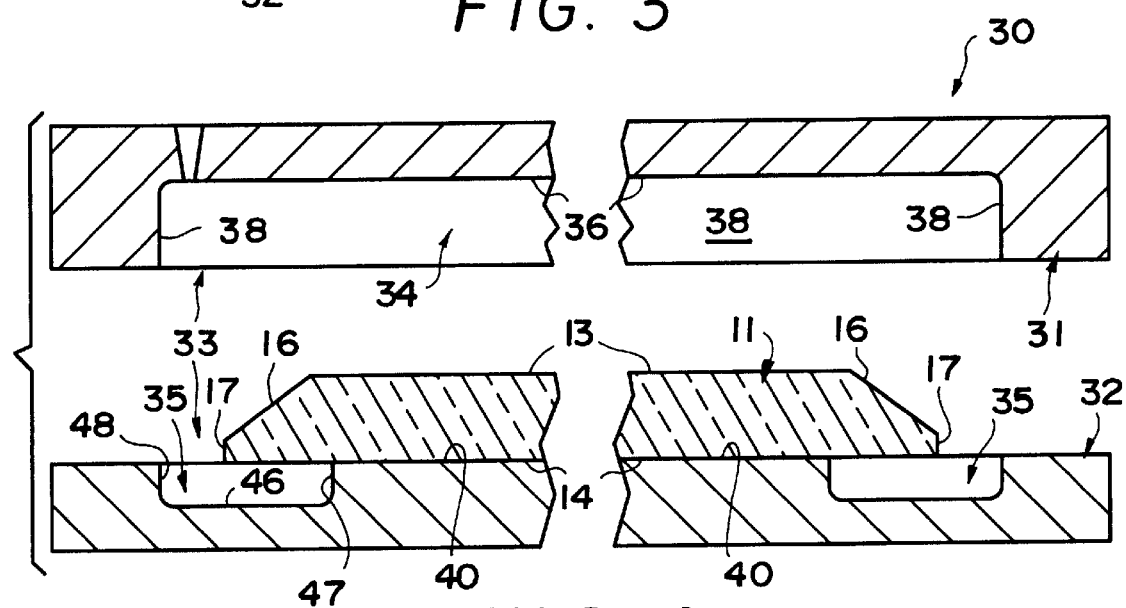
FIG. 4 is a vertical cross-sectional view of the mold of FIG. 3, and illustrates a glass sheet positioned with a peripheral edge thereof in overlying relationship to a peripheral upwardly opening cavity portion of the lower mold body.

The glass sheet 11 (FIG. 4) is inserted between the mold bodies 31, 32 when the latter are open in a conventional manner with the second surface 14 of the glass sheet 11 resting atop the parting surface 40 of the mold body 32. The peripheral edge 17 of the glass sheet 14 lies between the surfaces 47, 48 about the entirety of the cavity portion 35, and the peripheral edge 17 is spaced inboard from the surfaces 38, 48 (FIG. 4).

Figure 5:
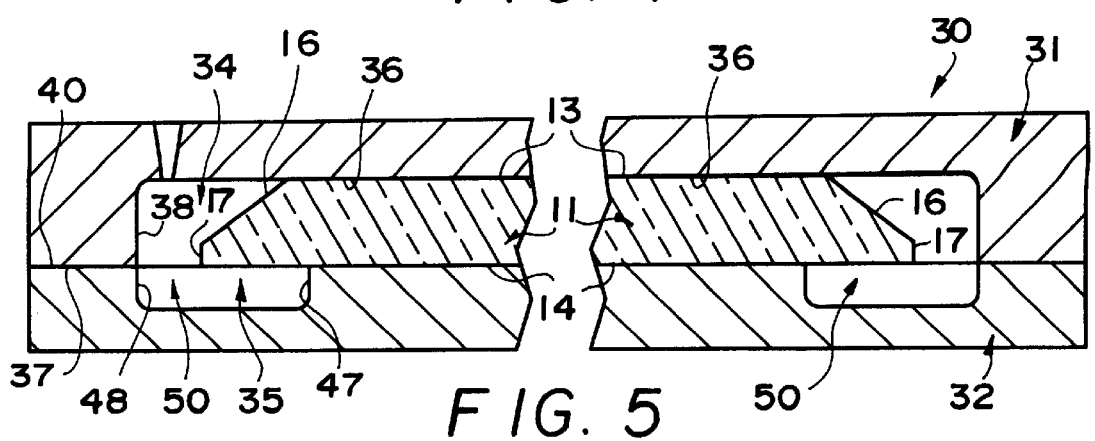
FIG. 5 is a vertical cross-sectional view of the mold of FIGS. 3 and 4, and illustrates the mold bodies in their closed position with an upper or first surface of the glass sheet lying in a plane coplanar to a surface of the upper mold body defining a portion of the cavity thereof.

The mold bodies 31, 32 are closed in the manner illustrated in FIG. 5. In the closed position, the glass sheet 11 is clamped between the surfaces 36, 40, as is readily apparent in FIG. 5. Mold closing techniques are conventional in the art, and suffice it to say that the mold bodies 31, 32 are brought to the closed position of FIG. 5 such that a peripheral cavity portion 50 is defined by the surfaces 47, 46, 48, 38, a peripherally outboard surface portion (unnumbered) of the surface 36, and the surfaces 16, 17 and a portion (unnumbered) of the surface 14 of the glass sheet 11 outboard of the surface 47. A comparison between FIGS. 2 and 5 indicates the substantial identity between the cross-sectional configuration of the peripheral cavity portion 50 and the cross-sectional configuration of the encapsulation, frame or border 12 (FIG. 2) injection molded therein.

Figure 6:
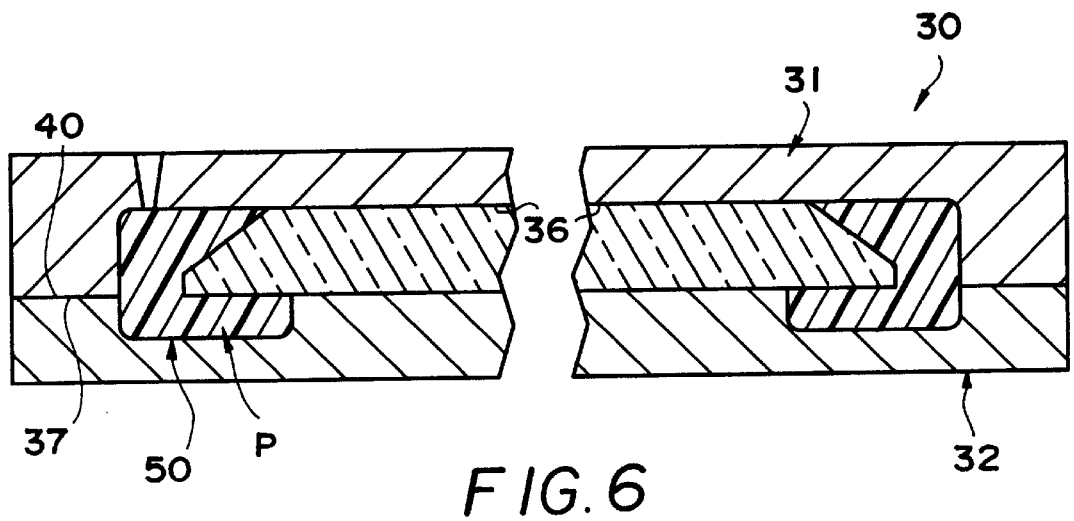
FIG. 6 is a vertical cross-sectional view of the mold, and illustrates polymeric/copolymeric synthetic plastic material injected into the mold cavity and encapsulating a periphery of the glass sheet to form an undercut interlock therewith while forming a "flush-to-front" exterior surface.
Figure 7:
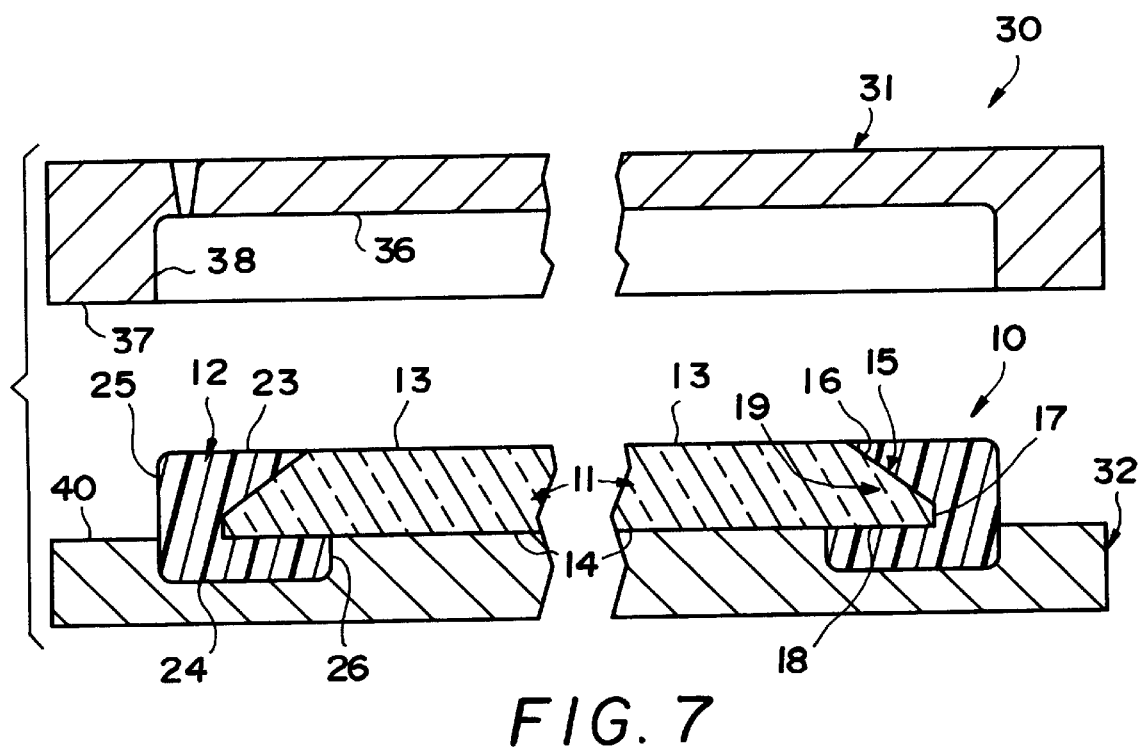
FIG. 7 is a vertical cross-sectional view of the mold of FIGS. 3 through 6, and illustrates the mold bodies moved to an open position incident to the removal therefrom of the bordered, framed or encapsulated glass sheet.

As is best illustrated in FIG. 6 of the drawings, synthetic polymeric/copolymeric plastic material P is injected into the peripheral cavity portion 50 resulting in the formation of the encapsulation, frame or border 12 which forms the "flush-to-front" and interlocked configuration of the computer screen 10 heretofore described upon the eventual removal of the computer screen 10 being effected by the opening of the mold bodies 31, 32 in the manner illustrated in FIG. 7. Thereafter, the computer screen 10 can be raised upwardly, removed from the mold 30, and the process repeated.

Figure 8:
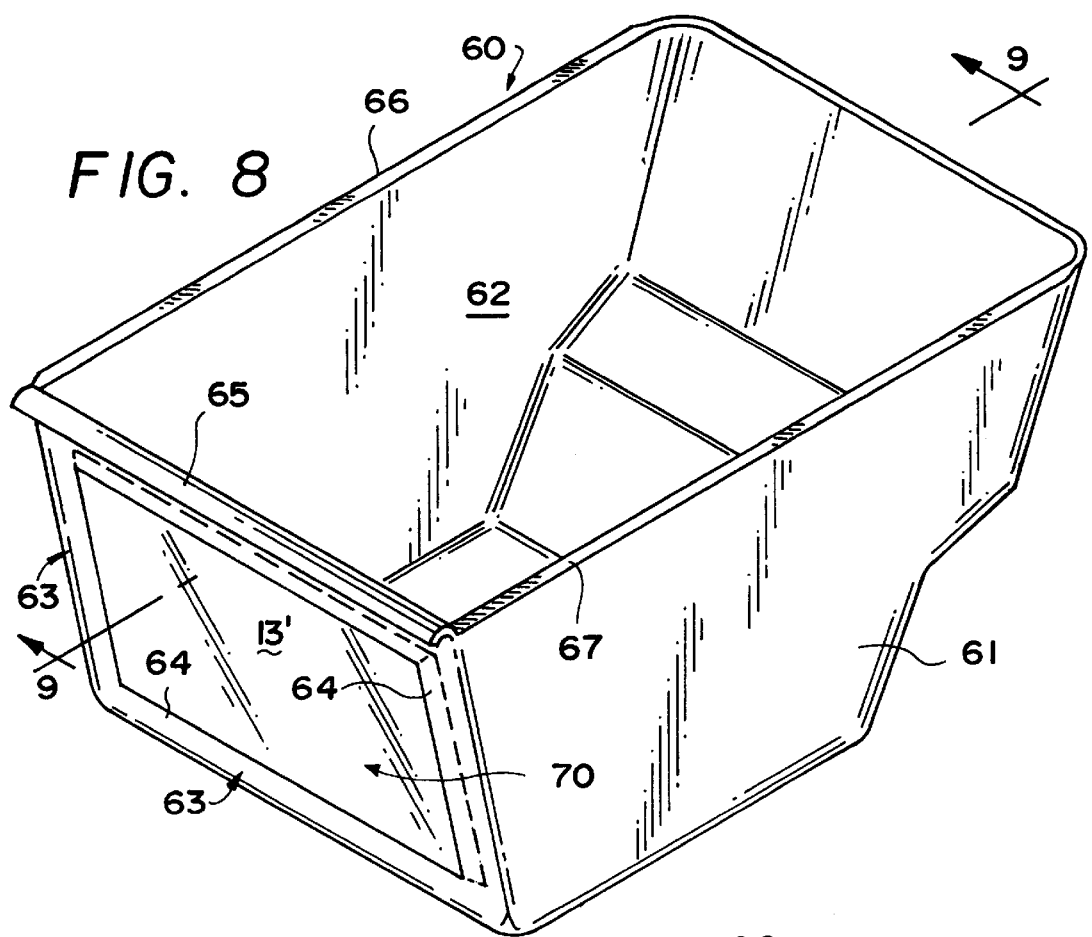
FIG. 8 is a perspective view of another article manufactured in accordance with this invention, and illustrates a refrigerator crisper drawer which includes a glass sheet in a front wall thereof completely encapsulated by a border or frame created during the in situ injection molding of the crisper drawer.
Figure 9:
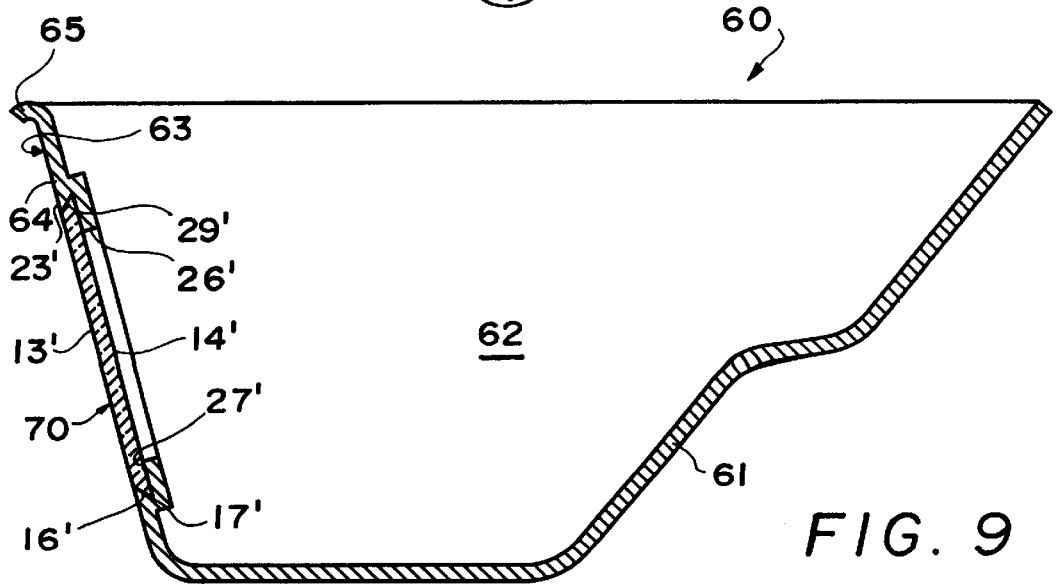
FIG. 9 is a slightly enlarged vertical cross-sectional view taken generally along line 9—9 of FIG. 8, and illustrates the undercut interlocked juncture between a periphery of the glass sheet and the border or frame of the front wall of the crisper drawer.

Though the method of forming a unitized article 10 in the manner just described is preferably associated with a computer screen or a computer glare filter or the like, other products are equally formed in accordance with this invention, such as an article of manufacture 60 of FIGS. 8 and 9 of the drawings which is a refrigerator "crisper" drawer defined by an injection molded body 61 having an interior chamber 62 and a front wall 63 including a border or border portion 64 of a generally rectangular or polygonal configuration. A handle 65 and opposite generally parallel side edges or sliders 66, 67 can be integrally molded during the injection molding of the article or drawer 60 to allow the drawer to be mounted in sliding relationship with complementary side slide rails of an associated refrigerator (not shown). A glass sheet 70 is disposed in "flush-to-front," interlocked injection molded relationship to the front wall 63 specifically in association with the border portion or frame portion 64 thereof. The glass sheet 70 is of an identical configuration to the glass sheet 11 of FIG. 2 and, thus, has like primed numerals associated therewith to depict the identity of the components.

Figure 10:
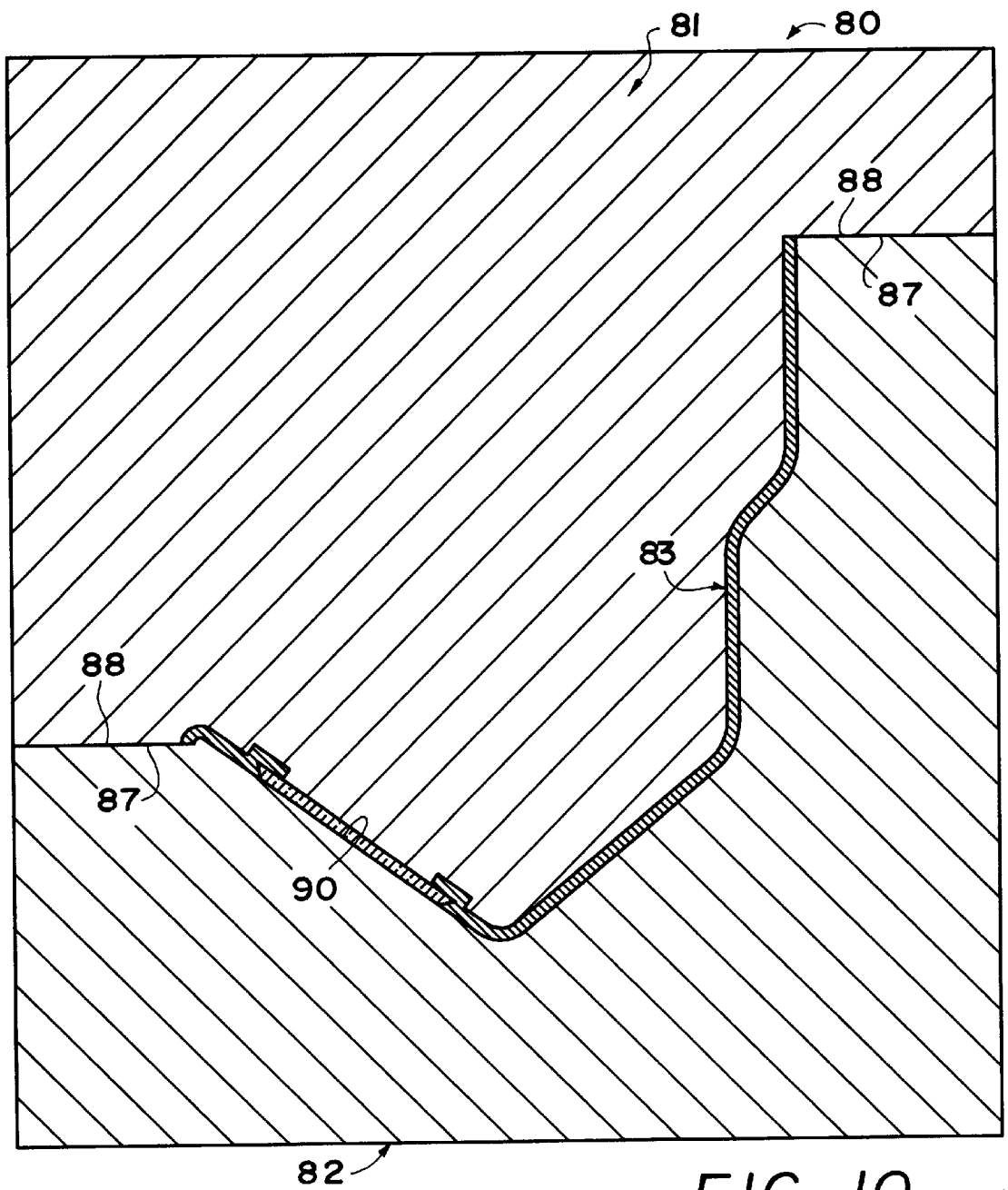
FIG. 10 is a vertical cross-sectional view through a mold, and illustrates two mold bodies in the closed position thereof defining a cavity in which the drawer is injection molded and simultaneously therewith the glass sheet is interlocked in "flush-to-front" relationship to the border of a front wall of the drawer.
Figure 11:
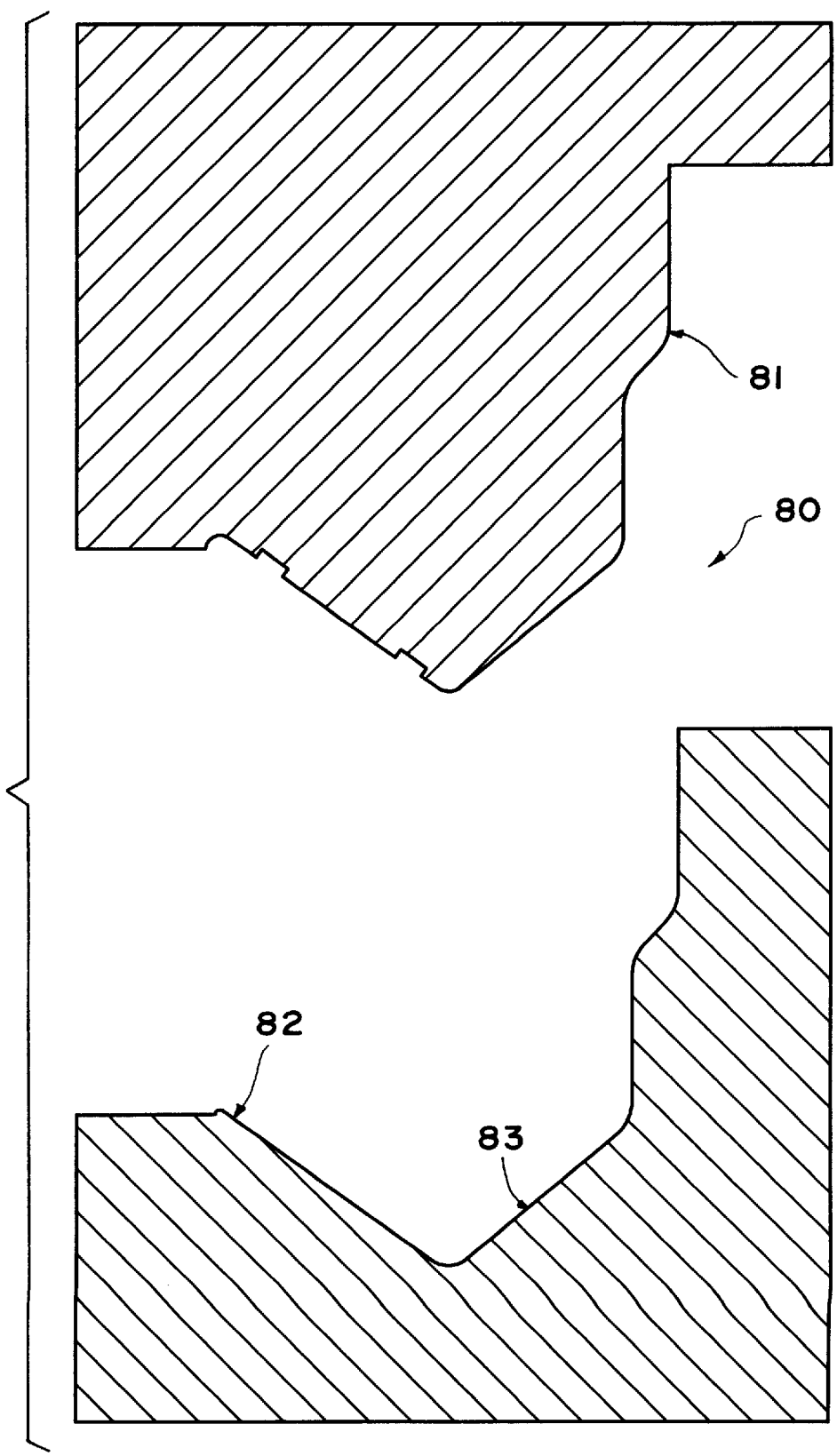
FIG. 11 is a vertical cross-sectional view of the mold of FIG. 10, and illustrates upper and lower mold bodies thereof moved to an opened position to facilitate the removal of the drawer therefrom.

As is best illustrated in FIGS. 10 and 11 of the drawings, a mold 80 is defined by a male mold body 81 and a female mold body 82 which collectively define a mold cavity 83 when the mold bodies 81, 82 are closed along respective parting line surfaces 87, 88. The parting line surface 88 merges with a relatively flat surface 90 against which the glass sheet 70 is positioned and retained, by conventional vacuum, for example, prior to the closing of the mold bodies 80, 82. When the mold bodies 81, 82 are closed, the cavity 83 thereof is a mirror image of the cross-section of the drawer illustrated in FIG. 10, and suitable polymeric/copolymeric material is conventionally injected into the cavity 83 to form not only the entire drawer 60, but contemporaneously therewith achieving the interlock between the peripheral edge portion (unnumbered) of the glass sheet 70 and the border portion 64 of the front wall 63.

Figure 12:
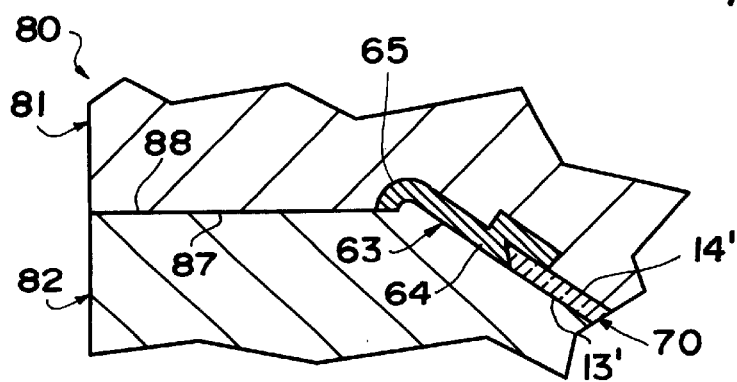
FIG. 12 is a fragmentary enlarged view, and illustrates details of the glass-to-border interlock of FIGS. 8 through 10 of the drawings.

The mold bodies 81, 82 are moved away from each other relatively vertically, in the manner illustrated by the oppositely directed headed arrows associated therewith, resulting in the complete opening of the mold bodies 81, 82 of the mold 80 and the subsequent removal of the drawer 60 therefrom. As is best illustrated in FIGS. 9 and 12, the relationship between the peripheral edge of the glass sheet 70 and the encapsulated border portion or frame portion 64 of the front wall 63 is identical to that of the glass sheet 11 and the border or frame 12 of the article 10 of FIGS. 1 and 2, namely, the two components are in "flush-to-front" interlocked injection-molded relationship to each other.

Figure 13:
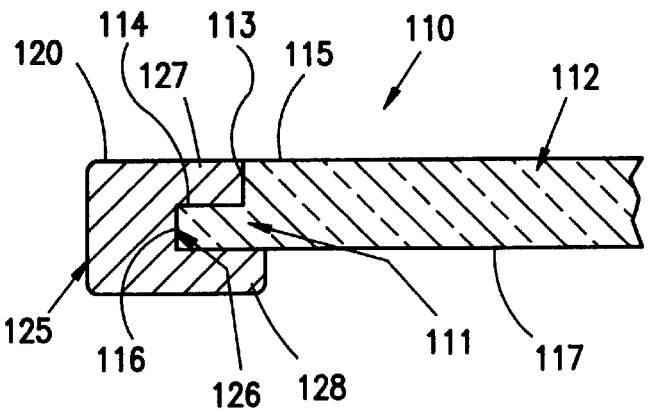
FIG. 13 is an enlarged fragmentary cross-sectional view similar to FIG. 2, and illustrates another undercut interlocked junction between a peripheral edge of a glass sheet and an injection molded encapsulation or frame, including the "flush-to-front" exterior thereof.

In further accordance with this invention, another article of manufacture is illustrated in FIG. 13 of the drawings and is generally designated by the reference numeral 110.

The article of manufacture 110 is specifically designed for utilization as a computer screen or a computer glare filter, just as in the case of the article of manufacture 10 of FIGS. 1 and 2. The major differences between the two articles 10, 110 are that in the article 10 the peripheral surface 15 includes the angled surface 16 thereof (FIG. 2), whereas in the article 110, a peripheral edge 111 of a glass sheet 112 is stepped by two peripheral surfaces 113, 114 which are normal to each other and are also normal to a respective upper surface 115 and an outboard peripheral surface 116 which merges with a lower surface 117. The surfaces 115, 117 of the glass 112 are parallel to each other and, of course, the surface 115 is flush with a surface 120 of a border, frame or encapsulation 125 having a groove 126 between peripheral legs or flanges 127, 128. The latter relationship serves to interlock the groove 126 of the encapsulation 125 and the peripheral edge 111 of the glass sheet 112.

Figure 14:
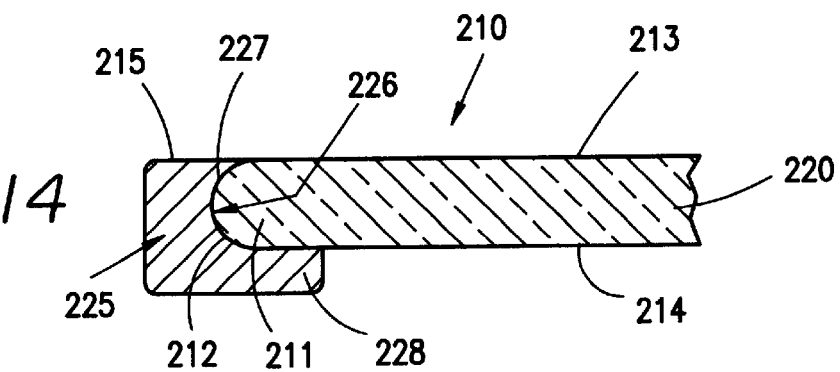
FIG. 14 is an enlarged fragmentary vertical cross-sectional view similar to FIG. 2, and illustrates another undercut interlocked junction between a rounded peripheral edge of a glass sheet and an injection molded encapsulation or frame, including the "flush-to-front" exterior thereof.

Another article of manufacture illustrated in FIG. 14 of the drawings is generally designated by the reference numeral 210.

The article of manufacture 210 includes a peripheral edge 211 which is defined by a full curved outwardly convex peripheral surface 212 which merges with an upper surface 213 and with a lower surface 214. The surfaces 213, 214 are parallel to each other and the surface 213 is flush with a surface 215 of a border, frame or encapsulation 225. The encapsulation 225 includes a groove 226 located between peripheral legs or flanges 227, 228. The latter relationship interlocks the peripheral edge 211 of the glass 220 with the groove 226 of the encapsulation 225.

Figure 15:
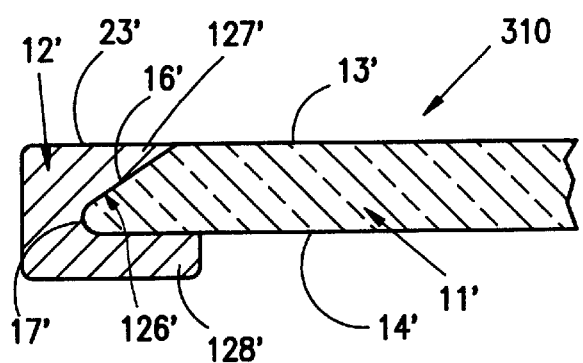
FIG. 15 is an enlarged fragmentary vertical cross-sectional view similar to FIG. 2, and illustrates another undercut interlocked junction between a peripheral edge of a glass sheet having a rounded nose and an injection molded encapsulation or frame, including the "flush-to-front" exterior thereof.

Another article of manufacture is illustrated in FIG. 15 of the drawings and is generally by the reference numeral 310. The article of manufacture 310 is essentially identical to the article of manufacture 10 of FIG. 2 and has numerals identical to those appearing in FIG. 2, except primed to indicate identical structure/components thereof. The major difference between the articles 10, 310 resides in the glass sheet 11' of the article 310 having a peripheral terminal edge surface or nose 17' which is rounded, as compared to the flat peripheral surface 17 of the article 10 (FIG. 2). Furthermore, an angled surface 16' of the article 310 defines a substantially lesser included angle with the surface 14' than the angle included by the surfaces 14, 16 of the article of manufacture 10. However, surfaces 13', 23' of the glass 11' and the encapsulation 12', respectively, are flush to each other.

Figure 16:
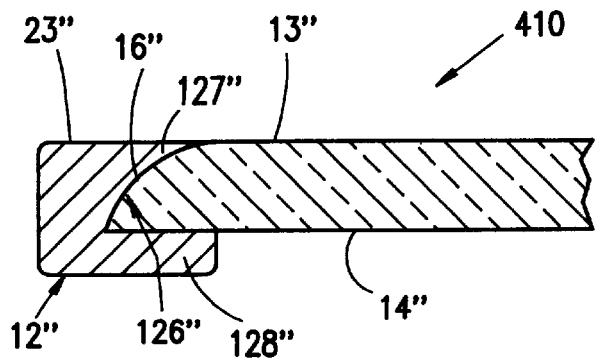
FIG. 16 is an enlarged fragmentary vertical cross-sectional view similar to FIG. 2, and illustrates another undercut interlocked junction between a peripheral edge of a glass sheet having a continuously curved exterior surface portion and an injection molded encapsulation or frame, including the "flush-to-front" exterior thereof.

Another article of manufacture 410 of FIG. 16 is substantially identical to the article of manufacture 310, except a surface 16" thereof is curved along an arc of constant radius between surfaces 13" and 14" with the double primes being utilized to identify surfaces identical to those of the article of manufacture 310 of FIG. 14. The surface 13" is also flush to a surface 23" of an encapsulation or border 12" of the article 410.

Any one of the junctures illustrated in FIGS. 13 through 16 of the drawings can, of course, be utilized in a drawer, such as the drawer 60 of FIGS. 8 and 9 of the drawings, or comparable structure.

Although a preferred embodiment of the invention has been specifically illustrated and described herein, it is to be understood that minor variations may be made in the apparatus without departing from the spirit and scope of the invention, as defined the appended claims.

What is claimed is:

1. A method of forming a unitized article which includes a border along a periphery of a glass sheet comprising the steps of:
   (a) providing a glass sheet having first and second opposite surfaces merging with each other along a peripheral surface which includes an angled surface setting-off with the glass sheet first surface an included angle substantially greater than normal,
   (b) placing the glass sheet in a mold having opposing cavity portions which collectively define a cavity including a peripheral edge cavity portion defined in part by a cavity defining surface which lies in the plane of the glass sheet first surface when the mold is closed,
   (c) closing the mold such that the cavity defining surface and the glass sheet angled surface set-off an angle complementary to said included angle and with the glass sheet first surface abutting the cavity defining surface inboard of the angled surface, and
   (d) injecting hot synthetic plastic material into the peripheral cavity portion to completely encapsulate the glass sheet periphery by a synthetic plastic material border having a first exterior surface coplanar with the glass sheet first surface whereby the latter two surfaces are flush and the glass sheet periphery is in undercut interlocked relationship with the border.

2. The method as defined in claim 1 wherein the border has a second exterior surface non-coplanar to and spaced from the glass shelf second surface.

3. The method as defined in claim 1 wherein the included angle is substantially 135°.

4. The method as defined in claim 1 including the step of grinding the peripheral surface to form the angled surface thereof.

5. The method as defined in claim 1 wherein the angled surface and the glass sheet second surface merge at a peripheral terminal edge surface.

6. The method as defined in claim 1 wherein the angled surface and the glass sheet second surface merge at a peripheral terminal edge surface ranging between 0.005 to 0.02 inch.

7. The method as defined in claim 1 wherein the unitized article is a flush-to-front computer screen.

8. The method as defined in claim 1 wherein the unitized article is a flush-to-front wall of a drawer.

9. The method as defined in claim 1 wherein the mold includes at least two mold bodies having opposing contacting surfaces in the closed position of the mold defining a parting line plane of the mold, and the parting line plane is coplanar to the glass sheet second surface.

10. The method as defined in claim 9 wherein the border has a second exterior surface non-coplanar to and spaced from the glass shelf second surface.

11. The method as defined in claim 9 wherein the included angle is substantially 135°.

12. The method as defined in claim 9 including the step of grinding the peripheral surface to form the angled surface thereof.

13. The method as defined in claim 9 wherein the angled surface and the glass sheet second surface merge at a peripheral terminal edge surface.

14. The method as defined in claim 9 wherein the angled surface and the glass sheet second surface merge at a peripheral terminal edge surface ranging between 0.005 to 0.02 inch.

15. The method as defined in claim 9 wherein the unitized article is a flush-to-front computer screen.

16. The method as defined in claim 9 wherein the unitized article is a flush-to-front wall of a drawer.

17. The method as defined in claim 1 wherein the border includes a peripheral edge in spaced relationship to at least a portion of the angled surface.

18. The method as defined in claim 2 wherein the border includes a peripheral edge in spaced relationship to at least a portion of the angled surface.

19. The method as defined in claim 9 wherein the border includes a peripheral edge in spaced relationship to at least a portion of the angled surface.

20. The method as defined in claim 10 wherein the border includes a peripheral edge in spaced relationship to at least a portion of the angled surface.

* * * * *